United States Patent
Budianu et al.

(10) Patent No.: US 10,236,809 B2
(45) Date of Patent: Mar. 19, 2019

(54) METHOD AND DEVICE FOR OPERATING AN ELECTRIC MACHINE

(71) Applicant: Continental Teves AG & Co. oHG, Frankfurt (DE)

(72) Inventors: Bogdan Budianu, Oberursel (DE); Vlad Gradinaru, Giroc (RO); Tom Kaufmann, Ippenschied (DE); Marcu Bogdan, Timisoara (RO)

(73) Assignee: Continental Teves AG & Co. oHG, Frankfurt (DE)

( * ) Notice: Subject to any disclaimer, the term of this patent is extended or adjusted under 35 U.S.C. 154(b) by 66 days.

(21) Appl. No.: 15/439,348

(22) Filed: Feb. 22, 2017

(65) Prior Publication Data

US 2017/0163188 A1    Jun. 8, 2017

Related U.S. Application Data

(63) Continuation of application No. PCT/EP2015/068643, filed on Aug. 13, 2015.

(30) Foreign Application Priority Data

Aug. 22, 2014 (EP) .................................. 14465520
Oct. 9, 2014 (DE) ........................ 10 2014 220 516

(51) Int. Cl.
*H02P 6/28* (2016.01)
*H02P 27/08* (2006.01)
(Continued)

(52) U.S. Cl.
CPC ............ *H02P 6/28* (2016.02); *H02P 21/0003* (2013.01); *H02P 21/22* (2016.02); *H02P 27/08* (2013.01); *H02P 2101/45* (2015.01)

(58) Field of Classification Search
USPC ........................................ 318/599, 609, 610
See application file for complete search history.

(56) References Cited

U.S. PATENT DOCUMENTS 3,806,787 A * 4/1974 Erler .................... G05B 1/02
318/599
4,290,001 A * 9/1981 Espelage ............. H02P 23/0077
318/802

(Continued)

FOREIGN PATENT DOCUMENTS

DE    102007017296 A1    8/2008
DE    102012215811 A1    3/2014

(Continued)

OTHER PUBLICATIONS

International Search Report and Written Opinion dated Nov. 17, 2015 from corresponding International Patent Application No. PCT/EP2015/068643.
German Search Report dated Apr. 2, 2015 for corresponding German Patent Application No. 10 2014 220 516.6.

*Primary Examiner* — Bentsu Ro

(57) ABSTRACT

A method for operating an electric machine, in which a control device assigned to the electric machine is used to switch currents of winding phases of the electric machine in a pulse-modulated manner, provides that a current value of the direct input current of the control device is determined using current values of the winding phases and duty factors of the pulse modulation.

5 Claims, 1 Drawing Sheet

(51) Int. Cl.
*H02P 21/22* (2016.01)
*H02P 21/00* (2016.01)
*H02P 101/45* (2016.01)

(56) References Cited

U.S. PATENT DOCUMENTS

| | | | | | |
|---|---|---|---|---|---|
| 4,368,411 | A | * | 1/1983 | Kidd | H02P 6/24 318/400.09 |
| 4,437,051 | A | * | 3/1984 | Muto | H02P 21/09 318/808 |
| 4,458,192 | A | * | 7/1984 | Sakamoto | H02P 21/06 318/798 |
| 4,469,997 | A | * | 9/1984 | Curtiss | H02J 3/1892 318/729 |
| 4,490,666 | A | * | 12/1984 | Tanamachi | H02M 7/527 318/800 |
| 4,602,201 | A | * | 7/1986 | Edwards | H02P 27/048 318/798 |
| 4,673,851 | A | * | 6/1987 | Disser | H02M 1/14 318/599 |

FOREIGN PATENT DOCUMENTS

| | | |
|---|---|---|
| EP | 2096751 A1 | 9/2009 |
| JP | 2010178556 A | 8/2010 |
| JP | 20120268629 | 8/2010 |
| KR | 20080068254 A | 7/2008 |

* cited by examiner

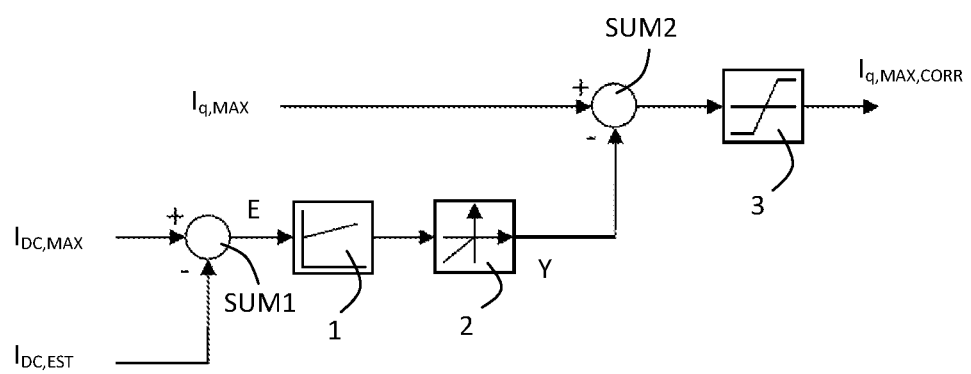

METHOD AND DEVICE FOR OPERATING AN ELECTRIC MACHINE

CROSS REFERENCE TO RELATED APPLICATIONS

This U.S. patent application claims the benefit of PCT patent application No. PCT/EP2015/068643, filed Aug. 13, 2015, which claims the benefit of German patent application No. 10 2014 220 516.6, filed Oct. 9, 2014, and EP 14 46 55 20 filed Aug. 22, 2014 all of which are hereby incorporated by reference.

TECHNICAL FIELD

The invention relates to a method for operating an electric machine and also a corresponding device.

BACKGROUND

Electric machines are used in the automotive technology industry by way of example for braking systems and/or steering systems of motor vehicles. Control devices that are embodied so as to operate the electric machines frequently comprise an inverter and can thus be influenced on the input side with a direct current and a direct voltage. This is advantageous in the case of being used in motor vehicles in which the vehicle electrical system provides both a direct voltage as well as a direct current.

The presence of an essentially constant power requirement of an electric machine of a motor vehicle and simultaneously a low voltage of the energy supply increases the current that is to be supplied. One consequence of the increased current is an increased heating of the electronic system of the direct current side or direct voltage side, said electronic system being used to control the machine. If the electronic components of the electronic control system are not designed for a continuously increased current, said components can become damaged. The load on the vehicle electrical system is increased as a result of the current consumption increasing in this manner and as a result of the further reducing supply voltage.

DE 10 2007 017 296 A1 discloses a method for operating an electric machine in which an estimated value of a prevailing direct current input of a control device is ascertained by an observer on the basis of modeled and in particular temperature-variable parameters, wherein a temperature dependency is compensated for on the basis of the temperature values that are ascertained. A difference between a predetermined maximum value of the direct current input and the estimated value of the direct current input is used as an input variable of an integral controller, wherein the output signal of said integral controller is supplied to a limiter. The output signal of the limiter is in turn used to set a direct threshold value of the alternating current that influences a desired value for setting the d-motor current or the q-motor current. If the estimated value of the direct current input is greater than the predetermined maximum value, the direct threshold value of the alternating current is reduced. However, particularly precise knowledge regarding the temperature behavior of the respective electronic components and also a temperature measurement are required, this necessitates an increased outlay and owing to the reduced complexity of the model with respect to reality is not sufficiently accurate for future motor vehicle systems.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for operating an electric machine is provided in which a pulse modulated switching procedure of the currents of winding phases of the electric machine is performed by a control device that is allocated to the electric machine, wherein a current value of the direct current input of the control device is ascertained on the basis of current values of the winding phases and duty cycles of the pulse modulation. A pulse width modulation is preferably used as a pulse modulation.

As a consequence, it is possible to improve the accuracy when providing a current that is used to control the electric machine since the direct current input of the control device is ascertained in an essentially temperature-dependent manner. Consequently, it is possible to avoid a current requirement above a threshold value as a result of which in particular it is possible to avoid the electric machine or the electronic system for controlling said electric machine from becoming damaged. Furthermore, it is possible to omit a step of ascertaining the temperature by means of corresponding sensors, as a result of which it is possible to save costs and reduce the susceptibility to error of the basic system. Moreover, in an advantageous manner a calculation is performed that is not dependent upon a direct voltage input, as a result of which the accuracy is likewise increased.

The direct current input is expediently determined on the basis of a sum that is formed from products of the duty cycles of the pulse modulation of the winding phases with the corresponding currents of the winding phases. Parameters that are derived from the mentioned variables or are associated therewith can likewise be used in accordance with the invention. Correction factors can likewise be provided for the calculation.

A control differential signal is ascertained on the basis of a predetermined maximum value of the direct current input and of the ascertained current value of the direct current input and supplied to a PI controller. Advantageously, the control procedure consequently occurs in a more rapid manner and the accuracy of the calculated values is increased.

Furthermore, a device for operating an electric machine that is controlled by pulse modulation, said device being embodied for the purpose of ascertaining a current value of a direct current input of a control device that is allocated to the electric machine on the basis of current values of the winding phases and duty cycles of the pulse modulation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 illustrates an exemplary embodiment for limiting a q-motor current for operating the electric machine on the basis of the estimated direct current input IDC.

DETAILED DESCRIPTION

The electric machine can be by way of example a synchronous machine and can be designed for a generator operation and motor operation. However, said electric machine can fundamentally also be another arbitrary electric machine. A synchronous machine comprises a stator having three winding phases that are arranged in each case offset at a resulting 120° and are in general referred to by U, V and W. Furthermore, the synchronous machine comprises a rotor and permanent magnets are arranged on said rotor. A control device for controlling the synchronous machine is purposefully influenced on the input side with a direct current input IDC and a direct voltage input UDC that are provided by means of a vehicle electrical supply system of the motor vehicle, which is provided by way of example in the case of a hybrid vehicle or electric vehicle by means of the battery. The control device comprises an inverter that generates the currents IU, IV, IW by means of a space vector pulse width modulator for the individual winding phases. Hereinunder, merely the term "pulse width modulation" is used, wherein by virtue of the present invention a use in similar-acting control methods, by way of example by means of pulse frequency modulation (PFM), is likewise included.

The exemplary embodiment is described with reference to a vector control for controlling the synchronous machine. However, the method in accordance with the invention can also be used in a comparable manner in control concepts that differ from said vector control. The control of the electrical variables occurs in the case of a vector control in a coordinate system that is fixed to the rotor, said system having a d-axis in the direction of the rotor magnetic field and a q-axis that stands at 90° (electrical angle connected by way of the pole pair number to the mechanical angle) with respect to said d-axis. A current Iq that is plotted in the direction of the q-axis determines—in a motor without reluctance torque—the torque that is output by the electric machine and is therefore referred to as the torque-forming current. A field-weakening control procedure can be performed so as to achieve high rotational speeds in which a current that flows in the direction of the d-axis is predetermined. The coordinate system that is fixed to the rotor rotates with respect to the stator which is why the winding phase currents IU, IV, IW or corresponding voltages UU, UV, UW of the winding phases of the stator are ascertained by way of a suitable transformation, for example Clarke-Park transformation, with reference to the rotor position. It is also possible to predetermine the voltages of the winding phases by way of alternative methods, such as for example a control procedure with the aid of values that are stored in a table. In accordance with the ascertained variables, on the basis of a pulse width modulation, for example a space vector modulation (SVPWM), periodic control cycles and also time periods corresponding to said control cycles are ascertained in which a respective winding phase is connected by means of the control switch to the upper or lower potential of the supply voltage.

A calculation of the direct current input IDC is performed on the basis of the electrical power consumption of the synchronous machine, wherein the measured winding phase currents IU, IV and IW and also the signals of the pulse width modulation PWM are used. The direct voltage or the direct current side (input) is provided by the power PDC to the control device for operating the synchronous motor. The electrical power PEL that is consumed by means of the synchronous machine corresponds to the output power of the control device, wherein said power can be calculated in accordance with equation (1) by multiplying the input power PDC by the efficiency ηINV of the control device.

$$PEL = \eta INV * PDC \tag{1}$$

In general, the efficiency of modern inverters is greater than 95% so that the input power of the control device, which comprises the inverter, or the input power PDC corresponds approximately to the output power PEL.

$$PDC \approx PEL \tag{2}$$

The powers can be calculated with reference to the respective currents IDC, IU, IV and IW and voltages UDC, UU, UV and UW, whereby on the basis of equation (2) equation (3) is produced:

$$UDC*IDC \approx UU*IU + UV*IV + UW*IW \tag{3}$$

In the case of pulse width modulated control procedures, a voltage of a winding phase occurs as an average value of the voltage over a PWM period. The voltages UU, UV and UW of the individual winding phases consequently occur as a product of the duty cycle of the pulse width modulation of the respective winding phase and the direct voltage input UDC, wherein the duty cycle is calculated from the ratio of the pulse duration to the duration of the time period. Calculating rules that differ from this approach but have the same effect can likewise be used.

$$UU = PWMU*UDC$$

$$UV = PWMV*UDC$$

$$UW = PWMW*UDC \tag{4}$$

It is possible to obtain equation (5) by using equation (4) in equation (3).

$$UDC*IDC \approx UDC*(PWMU*IU + PWMV*IV + PWMW*IW) \tag{5}$$

Since consequently the two powers comprise a dependency on the direct voltage input UDC, equation (5) can be transformed into equation (6) with which it is possible to obtain an expression so as to calculate the direct current input IDC that is merely dependent upon the currents IU, IV and IW and the duty cycles of the pulse width modulation and essentially temperature dependent.

$$IDC \approx PWMU*IU + PWMV*IV + PWMW*IW \tag{6}$$

The duty cycles of the pulse width modulation are preferably obtained from the signal curves of the currents IU, IV and IW that are ascertained by means of sensors. Alternatively, the control signals of the control devices or the inverter can also be used. The value of the direct current input IDC that is calculated or estimated in this manner is preferably used by a limiting unit that is further explained with reference to FIG. 1. However, said value can also be used for another arbitrary purpose.

In accordance with the exemplary embodiment of FIG. 1, a control difference E is ascertained at a summation point SUM1 from the difference of a predetermined maximum value IDC, MAX of the direct current input and the estimated value IDC,EST of the prevailing direct current input that is determined by means of the equation (6).

A controller 1 is provided and the control difference E is supplied on the input side to said controller that is preferably embodied as a PI controller. The output signal from the controller 1 is supplied to the limiter 2 on the input side, said limiter being embodied in such a manner that a control signal Y that is generated on the output side cannot assume positive values.

At a further summation point SUM2, the control signal Y and a predetermined maximum value Iq,MAX of the current that is to be plotted on the q-axis are summed and the value of the result that is obtained in this manner is limited by means of the limiter 3 to maximum permissible values. The current Iq,MAX,CORR is provided to the machine. The predetermined maximum value Iq,MAX is preferably calculated by means of the control device with reference to the respective requirements of the synchronous machine. By way of example in a brake system by means of a required build-up of pressure of the hydraulic fluid.

If the control difference E has a value greater than zero, in other words if the estimated direct current input IDC,EST is smaller than the predetermined maximum values IDC, MAX, the control signal Y is reduced towards zero since the limiter 2 prevents the control signal Y from taking in values greater than zero. Consequently, Iq,MAX=Iq,MAX,CORR. If the control difference is E<0, the value of the corrected maximum current Iq,MAX,CORR thus corresponds to the predetermined maximum current Iq,MAX that has been reduced by the control signal Y. The current Iq,MAX,CORR that is limited in this manner also has a feedback effect on the direct current input IDC so that a more stable working point is assumed and the power requirement of the synchronous machine is adjusted to suit the circumstances of the energy supply.

In addition or as an alternative, the right-hand part of equation (6) or the term for calculating the electrical power PEL of the electrical machine can be used in order to correct a mechanical power of the electric machine, said power being calculated on the basis of the prevailing values and a motor model and/or can be used as a state variable of a power control of the electric machine. A time constant of the calculation of the correction can in particular be comparatively large in the event of taking into account temperature influences since the time constants of this are slow in comparison to time constants of other control factors that are to be taken into account.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for operating an electric machine comprising:
   allocating to the electric machine a pulse modulated switching procedure of currents of winding phases of the electric machine with a control device;
   ascertaining a current value of a direct current input of the control device on the basis of current values of the winding phases and duty cycles of the pulse modulation; and
   determining the direct current input on the basis of a sum that is formed from products of the duty cycles of the pulse modulation of the winding phases with the corresponding currents of the winding phases.

2. The method of claim 1, further comprising:
   ascertaining a control difference signal on the basis of a predetermined maximum value of the direct current input; and
   supplying the ascertained current value of the direct current input to a PI controller.

3. An electric machine comprising:
   a control device which controls the electric machine by pulse modulation, wherein the control device includes instructions for:
     ascertaining a current value of a direct current input;
     allocating the direct current to the electric machine on the basis of current values of the winding phases and duty cycles of the pulse modulation; and
     determining the direct current input on the basis of a sum that is formed from products of the duty cycles of the pulse modulation of the winding phases with the corresponding currents of the winding phases.

4. The device of claim 3, further including instruction for:
   ascertaining a control difference signal on the basis of a predetermined maximum value of the direct current input; and
   supplying the ascertained current value of the direct current input to a PI controller.

5. An electric machine comprising:
   a control device which controls the electric machine by pulse modulation, wherein the control device includes instructions for:
     ascertaining a current value of a direct current input;
     allocating the direct current to the electric machine on the basis of current values of the winding phases and duty cycles of the pulse modulation
     determining the direct current input on the basis of a sum that is formed from products of the duty cycles of the pulse modulation of the winding phases with the corresponding currents of the winding phases
     ascertaining a control difference signal on the basis of a predetermined maximum value of the direct current input; and
     supplying the ascertained current value of the direct current input to a PI controller.

* * * * *